March 4, 1969  I. A. SPEELMAN  3,430,514

SWITCH FOR BATTERY HANDLE

Filed Aug. 7, 1967

INVENTOR.
IRVING A. SPEELMAN

BY
Blum, Moscovitz, Friedman, Blum & Kaplan
ATTORNEYS

March 4, 1969     I. A. SPEELMAN     3,430,514
SWITCH FOR BATTERY HANDLE

Filed Aug. 7, 1967     Sheet 2 of 2

INVENTOR.
IRVING A. SPEELMAN

BY
Blum, Moscovitz, Friedman, Blum & Kaplan
ATTORNEYS

United States Patent Office 3,430,514
Patented Mar. 4, 1969

3,430,514
SWITCH FOR BATTERY HANDLE
Irving A. Speelman, Roslyn Heights, N.Y., assignor to Propper Manufacturing Co. Inc., Long Island City, N.Y., a corporation of New York
Continuation-in-part of application Ser. No. 576,339, Aug. 31, 1966. This application Aug. 7, 1967, Ser. No. 662,264
U.S. Cl. 74—527    10 Claims
Int. Cl. G05g 5/00

ABSTRACT OF THE DISCLOSURE

A power controlling switch for a battery handle having at least two "on" positions and one "off" position in which a releasable positive action detent prevents inadvertent switch advancement away from the "off" position to the first of the "on" positions and away from any "on" position to a succeeding "on" position without hindering direct return to the "off" position from any of the "on" positions. The positive action detent also limits switch advancement on each operation thereof to a single indexing cycle as the switch is moved away from the "off" position toward any succeeding "on" position to prevent inadvertent bypass of any "on" position in the advancing direction.

CROSS REFERENCE TO RELATED APPLICATION

This application is a continuation-in-part of application Ser. No. 576,339, filed Aug. 31, 1966, now abandoned.

BACKGROUND OF THE INVENTION

This invention relates generally to a switch for a battery handle and more particularly to improved switch arrangements for use in battery handles of the type used to mount and illuminate medical diagnostic instruments. While the invention is not limited to use with battery handles of the aforesaid type, it will be understood that the improved switch of the instant invention is particularly suited for incorporation in such battery handles.

Specific reference is made to applicant's Patent No. 3,315,207, issued Apr. 18, 1967, which discloses an improved battery handle for use with medical diagnostic instruments. For simplicity and to avoid duplication, reference will hereafter be made to the aforesaid patent.

Battery handles of this general type are usually provided with switches having at least three positions: An OFF position, a first ON position at which intensity of illumination is controlled and a second ON position providing maximum illumination. Control of switch position is usually effected by rotation of a portion of the battery handle and, with prior constructions, the possibility has existed that inadvertent switching of the unit to one of the ON positions could occur thereby draining the battery to render the unit useless to the physician until the battery has been recharged.

SUMMARY OF THE INVENTION

Generally speaking, in accordance with the invention, a rotary switch is controlled by a releasable positive action detent whereby relative rotation in at least one direction from two adjacent positions, such as the OFF position and a first ON position or the first ON position and the second ON position, is prevented absent physical release of the positive action detent.

Accordingly, it is an object of this invention to provide and improved switch for a battery handle of this general type which requires positive action on the part of the operator to switch the unit to any of the ON positions.

Another object of the invention is to provide improved positive action detent means for a rotary switch.

A further object of the invention is to provide means for preventing the inadvertent bypassing of intermediate ON positions when the switch is advanced to the fully ON position.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 6 is a sectional view showing the relationship of the elements with the switch in the OFF position;

FIG. 8 is a view similar to FIG. 6 but showing the relationship of the elements when the button has been depressed and rotated to a first ON position; and FIG. 9 is a view similar to FIG. 8 but showing the relationship of the elements after the button has been released.

DESCRIPTION OF THE PREFERRED EMBODIMENTS

Figure 1:
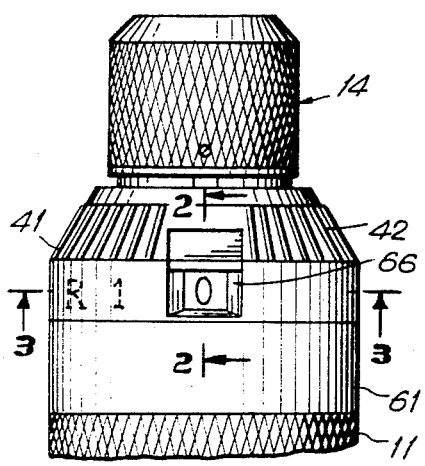
FIG. 1 is a partial elevational view of the top portion of a battery handle construction in accordance with the instant invention.

Where appropriate, like parts in this application and the aforesaid Patent No. 3,315,207 have been identified by like reference numerals thereby permitting the omission of certain parts from the instant application without effecting the sufficiency of the disclosure.

Figure 2:
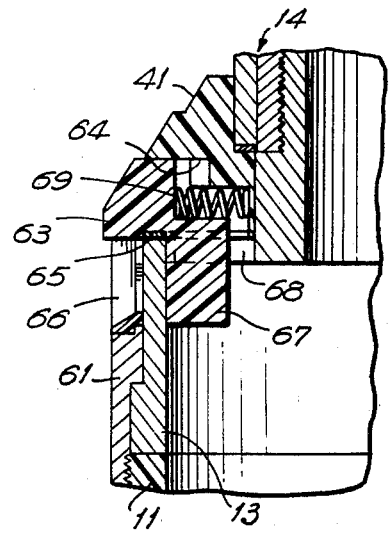
FIG. 2 is a partial sectional view taken along line 2—2 showing an embodiment of the invention.

Referring now to FIGS. 1 and 2, a casing 11 has removably mounted thereon a base member 13 encircled by a rotatable ring 61 which threadedly engages the casing. By the threaded engagement of the rotatable ring with the casing, the ring, base member and parts mounted thereto may be removed from the casing which houses a battery and recharge circuit (not shown).

Base member 13 extends upwardly and includes a threaded neck 62 on which is mounted a chucking head 14. The chucking head removably supports various medical diagnostic instruments and includes means for electrically connecting the diagnostic instruments to the battery for illumination of same.

An adjusting ring 41 having serrations 42 is fitted over and rides on base member 13 and is retained in assembled relationship with the base member by chucking head 14.

A switch button 63 is slideably mounted in a suitable slot 64 in adjusting ring and is mounted on an arcuately shaped support plate 65 slideably mounted between base member 13 and the adjusting ring. The adjusting ring is also provided with a window aperture 66 below slot 64 and the switch button providing visual access to a surface of base member 13.

A finger 67 depends from support plate 65 as part of switch button 63 and extends through an elongated opening 68 in base member 13. A spring 69 located in a suitable cutout 71 in the switch button acts between adjusting ring 41 and the switch button to urge the button 63, plate 65 and finger 67 assembly outwardly or away from the central axis of the unit.

Figure 3:
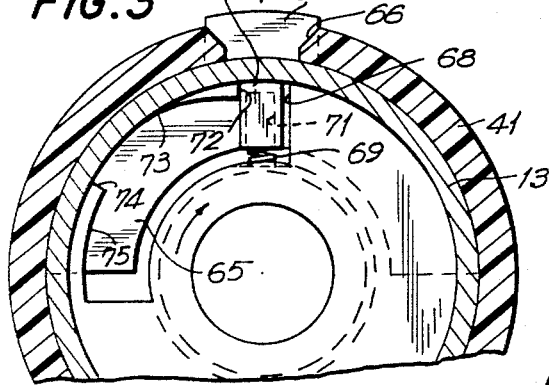
FIG. 3 is a partial sectional view of the embodiment of FIG. 2 taken along line 3—3 of FIG. 1.

Referring to FIG. 3, elongated opening 68 in the base member has a multicammed surface against which finger 67 bears under the biasing of spring 69. The position of the finger represented by FIG. 3 is the OFF position of the switch wherein movement of the finger relative to the base member is prevented by a first cam surface 72 defined by a portion of elongated opening 68. A second arcuate cam surface 73 whose use will hereafter be described merges smoothly from the first cam surface to a point of maximum opening whereafter there is defined a third cam surface 74 in the form of an abutment followed by a fourth cam surface 75 having an arcuate configuration of constant radius.

Omitted from the drawing is a rheostat element similar to rheostat element 22 described and shown in the aforesaid Patent No. 3,315,207. Finger 67 herein acts in a manner similar to shaft 46 in the prior patent to cooperate with slot 48 in the rheostat to effect operation of the rheostat element. The rheostat element has OFF, intermediate and ON positions for controlling illumination of the diagnostic instruments by the battery and the rheostat element is externally actuated through finger 67.

Referring again to FIG. 1, there is inscribed on the surface of base member 13 indicia representing the OFF position (0), the intermediate position (1) and the fully ON position (R). The function of the OFF position is obvious. The intermediate position is the normal position whereby the resistance of the rheostat is introduced into the electric circuit to control illumination of the diagnostic instruments. The intermediate position is used when the battery is in a full or reasonable state of charge. In such a state, full battery current to the diagnostic instrument would result in premature burnout of the instrument bulb. However, when the battery has lost much of its charge, it is desirable to eliminate the rheostat from the circuit and switching to the fully ON position (R) accomplishes this to give adequate illumination of the diagnostic instrument at low battery charge. The particular position of the rheostat is correlated with the indicia inscribed on the surface of base member 13 and observable through window aperture 66.

The operation of the switch arrangement may now be described in connection with FIGS. 1 through 4. The switch is in the OFF position in FIGS. 1 and 2 wherein relative rotation between base member 13 and finger 67 is prevented by engagement of the finger with cam surface 72. Since finger 67 also controls the rheostat shown in the aforesaid copending application, the unit is locked in the OFF position. By depression of switch button 13 against the action of spring 69, cam 72 is cleared by the button thereby permitting relative rotation of the button and the adjusting ring 41 which carries the button with respect to base member 13 which, as noted in the aforesaid copending application, supports the rheostat element. Thus rotation of button 63 and adjusting ring 41 relative to the base member effect switching operation of the unit.

Figure 4:
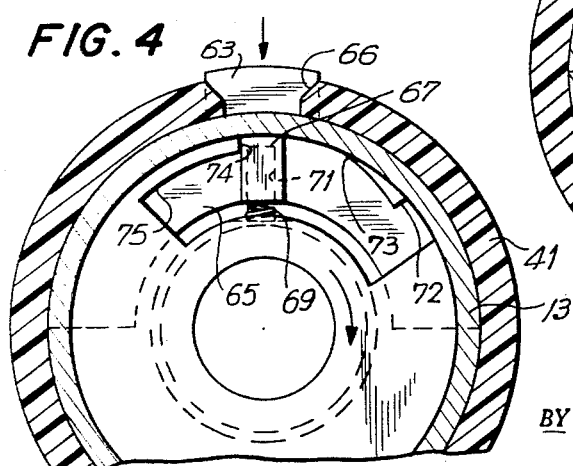
FIG. 4 is a view siiilar to FIG. 3 but showing the relationship of the elements with the switch in one of the ON positions.

After depression of button 63 and initial rotation of the adjusting ring, release of the button causes finger 67 to be biased by the spring against cam surface 73 and rotation may continue until the finger meets cam surface 74. This portion is shown in FIG. 4 and corresponds to the intermediate position whereby indicia (1) appears through window 66. For the sake of illustration, button 63 appears in the same position in FIG. 4 as in FIG. 3 and rotation of the base member with its elongated opening has been shown. Thus FIG. 4 shows an intermediate position of relative rotation.

At the intermediate position, a positive lock or detent is provided to prevent rotation to the maximum ON position without depression of the switch button. However, the unit can be rotated from the FIG. 4 position to the OFF position without depression of the button since the finger 67 will slide along cam surface 73 and drop into the OFF position.

It will be understood that, for rotation of the unit to the fully ON position, it is merely required to depress the button so that the adjusting ring may be rotated past the FIG. 4 position to the fully ON position. In the fully ON position, the unit may be rotated back to the intermediate or OFF positions without depression of the button.

From the foregoing, it is apparent that, when the unit is in the OFF position, inadvertent actuation is not possible thereby reducing the likelihood that the unit will be left on when not in use. Also, the biasing of finger 67 by spring 69 provides a positive stop in the intermediate position when the unit is switched on thereby requiring a conscious act to switch the unit to the fully ON position. On the other hand, the arrangement of the cam surfaces of elongated opening 68 are such that the unit may be moved to the OFF position without operation of the button.

It will be understood that, if additional intermediate ON positions are desired, it is merely necessary to provide additional cam surfaces similar to surfaces 73 and 74 to establish a plurality of such intermediate positions.

Figure 5:
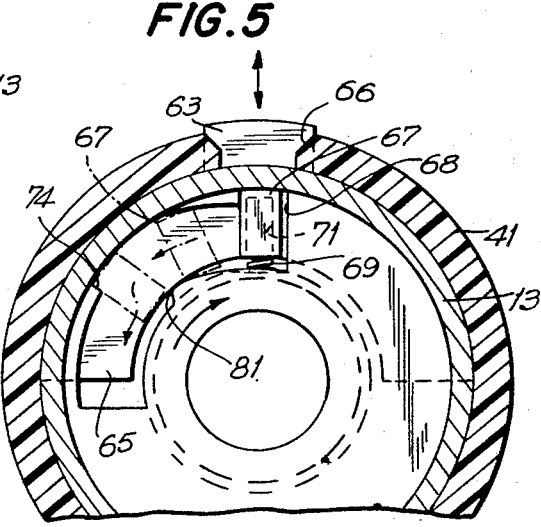
FIG. 5 is a view similar to FIG. 3 showing a modified form of the invention.

A modified arrangement is disclosed in FIG. 5 wherein the surface of elongated opening 68 opposite that carrying cam surface 72 through 75 is provided with a smooth cam portion 81 which generally parallels second cam surface 73 but drops off sharply behind third cam surface 74. In this embodiment, as the adjusting ring is rotated from the OFF position subsequent to depression of button 63, the rear portion of finger 67 will engage cam portion 81 and positively drive the finger outwardly to insure positive engagement of the finger with cam surface 74 when the intermediate position is reached. While the positive drive by cam portion 81 duplicates the action of spring 69, the positive drive overcomes the possibility that the unit could be rotated past the intermediate position should the operator inadvertently hold button 63 depressed. In the embodiment of FIG. 5, maintaining the button depressed would not be possible since it would be positively driven outwardly by the finger riding on cam portion 81.

The terminal part of cam portion 81 opposite but behind cam surface 74 drops off sharply so as not to interfere with the depression of the button when it is desired to switch the unit from the intermediate to the fully ON position. The terminal portion has a smooth configuration so as to permit return from the fully ON to the OFF position without requiring button actuation.

Figure 6:
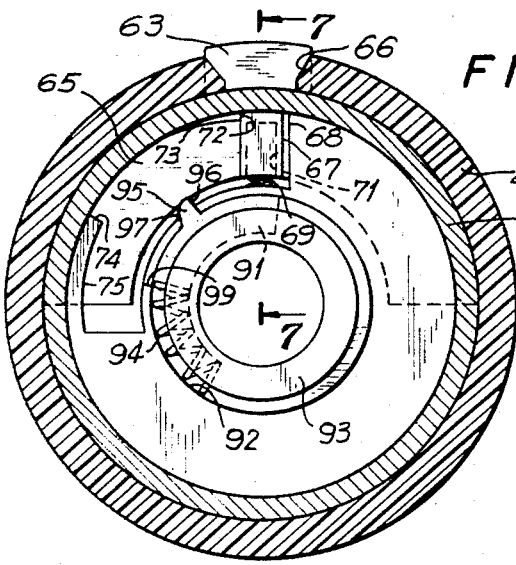
FIGS. 6–9 are views of another embodiment of the instant invention with FIG. 7 being a view similar to FIG. 2 and FIGS. 6, 8 and 9 being views taken along line 3—3 of FIG. 1.

Another embodiment of the invention is disclosed in FIGS. 6 through 9 wherein like numerals designate like parts. In the embodiment of FIGS. 6 through 9, positive stop means are provided which require physical release of the button when the switch has been advanced to the intermediate ON position before it can be advanced to the fully ON position. An arcuate plate 91 is slidably mounted within base member 13 in a suitable arcuate slot 92 and retained therein by a collar 93 secured to the base member. A spring 94 biases arcuate plate 91 in the clockwise direction to the normal position as shown in FIG. 6. A catch finger 95 projects from arcuate plate 91 and has an abutment face 96 and a cam face 97. Catch finger 95 extends through a slotted portion of base member 13 which thereby defines stops 98 and 99.

As stated above, the normal position of this embodiment is shown in FIG. 6, in which the switch is in the OFF position, switch button 63 is biased outwardly by spring 69 and arcuate plate 91 is biased in the clockwise direction by spring 94.

Figure 8:
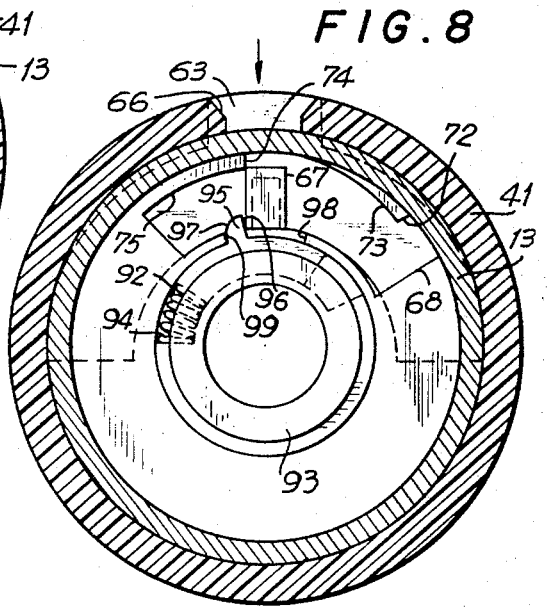
Figure 7:
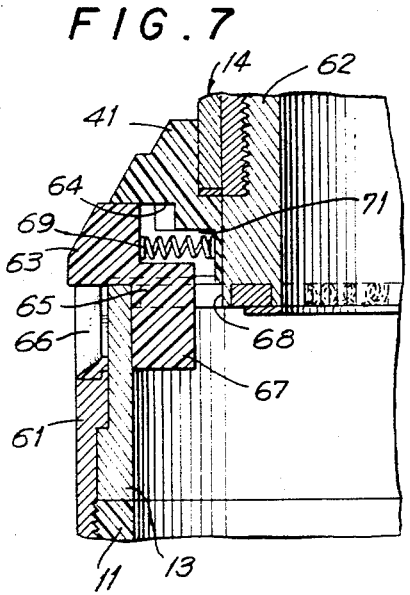

When it is desired to rotate the switch to an ON position, button 63 is depressed as shown in FIG. 8 to move finger 67 out of engagement with first cam surface 72 thereby permitting relative rotation. However, as finger 67 moves toward the first ON position, its depressed condition causes engagement thereof with the abutment face 96 on catch finger 95 and, while the button remains depressed, arcuate plate 91 is rotated in the counter clockwise direction against the biasing of spring 94 with the limit of rotation being reached when the catch finger moves into engagement with stop 99. This position is shown in FIG. 8 and it will be noted that the switch cannot be moved past the intermediate ON position while the button 63 remains depressed even though finger 67, in the depressed condition of the button, is capable of clearing third cam surface 74 and thus inadvertent actuation beyond a single indexed position is not possible even though the operators finger may remain on switch button 63.

Figure 9:
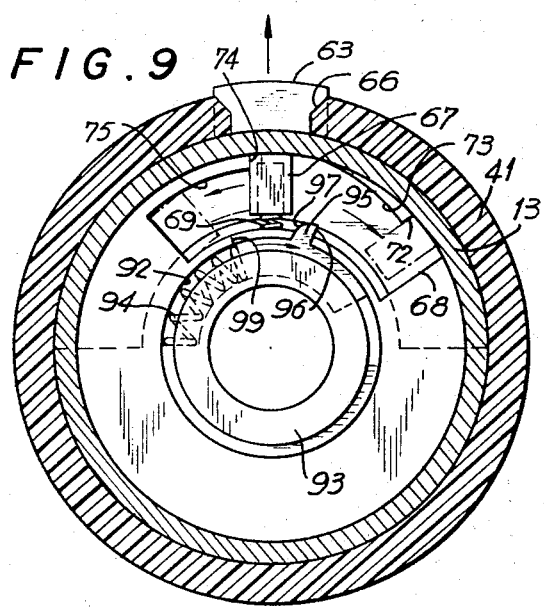

On release of switch button 63, it and finger 67 are biased outwardly under the action of spring 69 thereby releasing catch finger 95 to be returned to its normal position under biasing of spring 94, as shown in FIG. 9. In the FIG. 9 position, the button cannot be inadvertently advanced to the fully ON position because of engagement of finger 67 with third cam surface 74 but, with return of catch finger 95 to its normal position, button 63 can then be depressed again in order to advance the switch to the fully ON position in the manner described above in connection with other embodiments.

Return from the fully ON position to the intermediate ON position or from the intermediate ON position to the OFF position is not effected and no button depression is required. The various cam surfaces against which finger 67 rides, together with the cooperation of spring 69, permits free return of the switch and, as finger 67 approaches catch finger 95 on the return cycle, the biasing of finger 67 by spring 69 moves the finger 67 away from the catch finger and this is further aided by the provision of a cam face 97 on one side of the catch finger.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A multi-position switch controlling assembly comprising a base member, an adjusting ring rotatably mounted on said base member, and control means acting between said base member and said adjusting ring for permitting relative rotation in one direction only on actuation of said control means and permitting free relative rotation in the opposite direction.

2. A multi-position switch controlling assembly comprising a base member, an adjusting ring rotatably mounted on said base member, and control means including a positive action detent acting between said base member and said adjusting ring for permitting relative rotation in one direction only on actuation of said control means and permitting free relative rotation in the opposite direction, said positive action detent means being constructed and arranged to limit rotation in said one direction to movement between two adjacent positions of said multi-position switch on each operation thereof.

3. A multi-position switch controlling assembly as claimed in claim 2 wherein said base member and said adjusting ring have confronting planar faces, said control means including a button slidable in said adjusting ring and having a finger extending through said base member and substantially perpendicular to the planar surface thereof, and pluri-cam configured opening in said base member, said finger being received through said opening, said pluri-cam configured opening and said finger acting as said positive action detent.

4. A multi-position switch controlling assembly as claimed in claim 3 wherein said control means further includes biasing means acting between said button and said adjusting ring for biasing said finger toward the cam surfaces of said opening.

5. A multi-position switch controlling assembly as claimed in claim 4 including a support plate slidably mounted between said confronting planar surfaces, said button and finger being carried by said support plate.

6. A multi-position switch controlling assembly as claimed in claim 3, said switch controlling assembly having an off position and at least two on positions, wherein one side of said opening is defined by at least four cam surfaces, the first and third cam surfaces being abutment surfaces defining said off position and an intermediate on position, respectively, the second and fourth cam surfaces being guiding surfaces, said control means including biasing means biasing said finger toward said one side of said opening.

7. A multi-position switch controlling assembly as claimed in claim 6 wherein the opposite side of said opening is defined by a cam portion opposite and substantially following the contour of said second cam surface.

8. A multi-position switch controlling assembly as claimed in claim 6 and including a catch finger slidably mounted on the opposite side of said opening, means biasing said catch finger toward a position opposite said second cam surface, and means limiting the movement of said catch finger in a direction against the biasing of said biasing means, said catch finger extending toward said finger carried by said support plate and adapted to be thereby engaged when said button is depressed during movement thereof from said off position toward said third cam surface.

9. A multi-position switch controlling assembly as claimed in claim 8 wherein said catch finger extends from an arcuate plate, said arcuate plate being slidably mounted on said base member for movement along an arc concentric with the center of rotation of said rotatably mounted adjusting ring.

10. A multi-position switch controlling assembly as claimed in claim 8 wherein said catch finger has an abutment face for engagement with said finger carried by said support plate when said switch is moved in a direction away from said off position, and a cam face disposed on the side of said catch finger opposite to the side which carries said abutment face.

References Cited

UNITED STATES PATENTS

| 3,127,786 | 4/1964 | Wooley | 74—527 |
| 2,560,850 | 7/1951 | Day | 74—527 |
| 2,620,672 | 12/1952 | McMahon | 74—527 |
| 3,173,306 | 3/1965 | Hoag | 200—166 |
| 3,130,826 | 4/1964 | Davis et al. | 74—527 |
| 3,255,647 | 6/1966 | Gray | 74—527 |
| 3,271,535 | 9/1966 | Vananzi | 200—166 |

FOREIGN PATENTS 214,970   8/1941   Switzerland.

FRED C. MATTERN, JR., *Primary Examiner.*

W. S. RATLIFF, JR., *Assistant Examiner.*